UNITED STATES PATENT OFFICE.

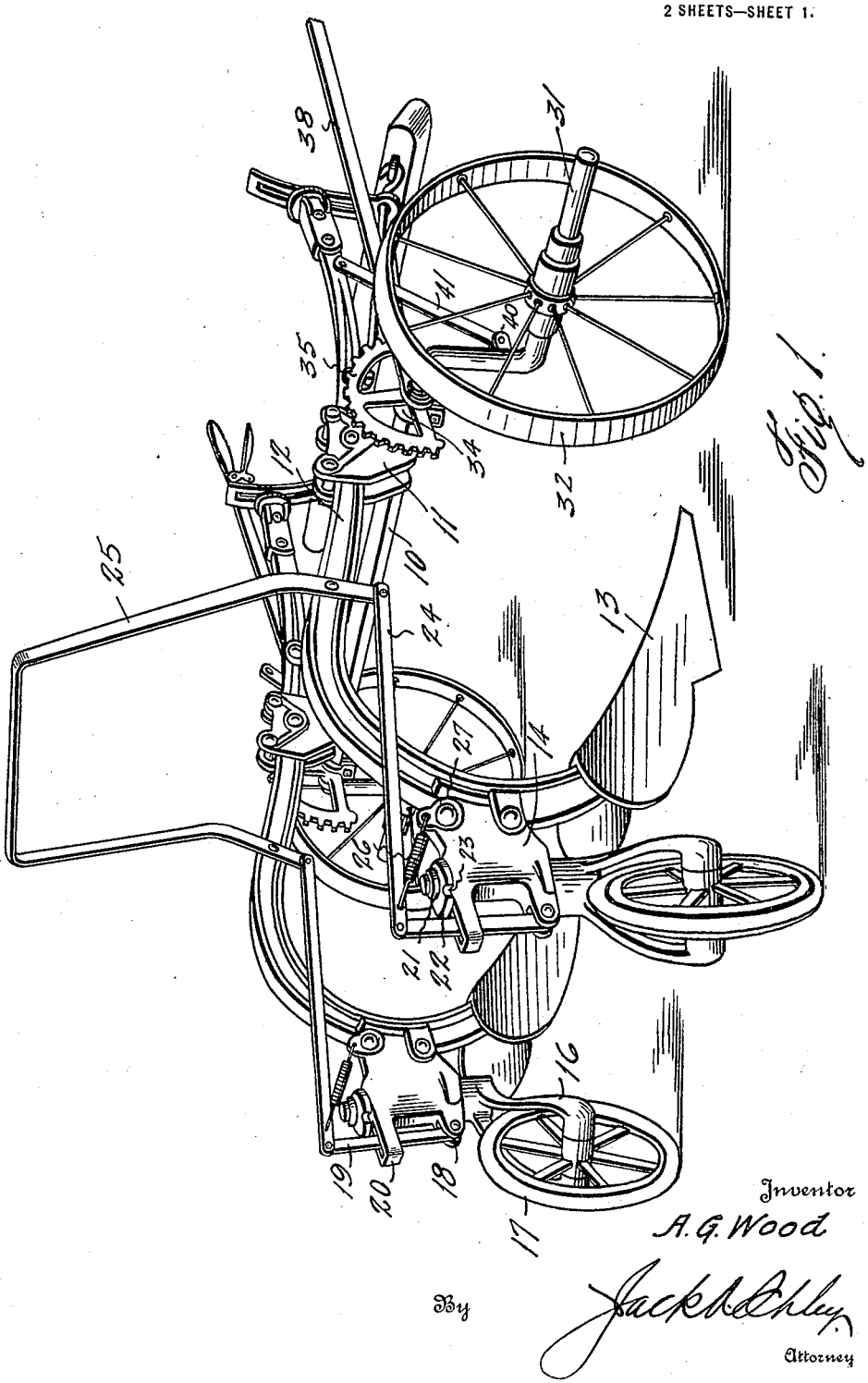

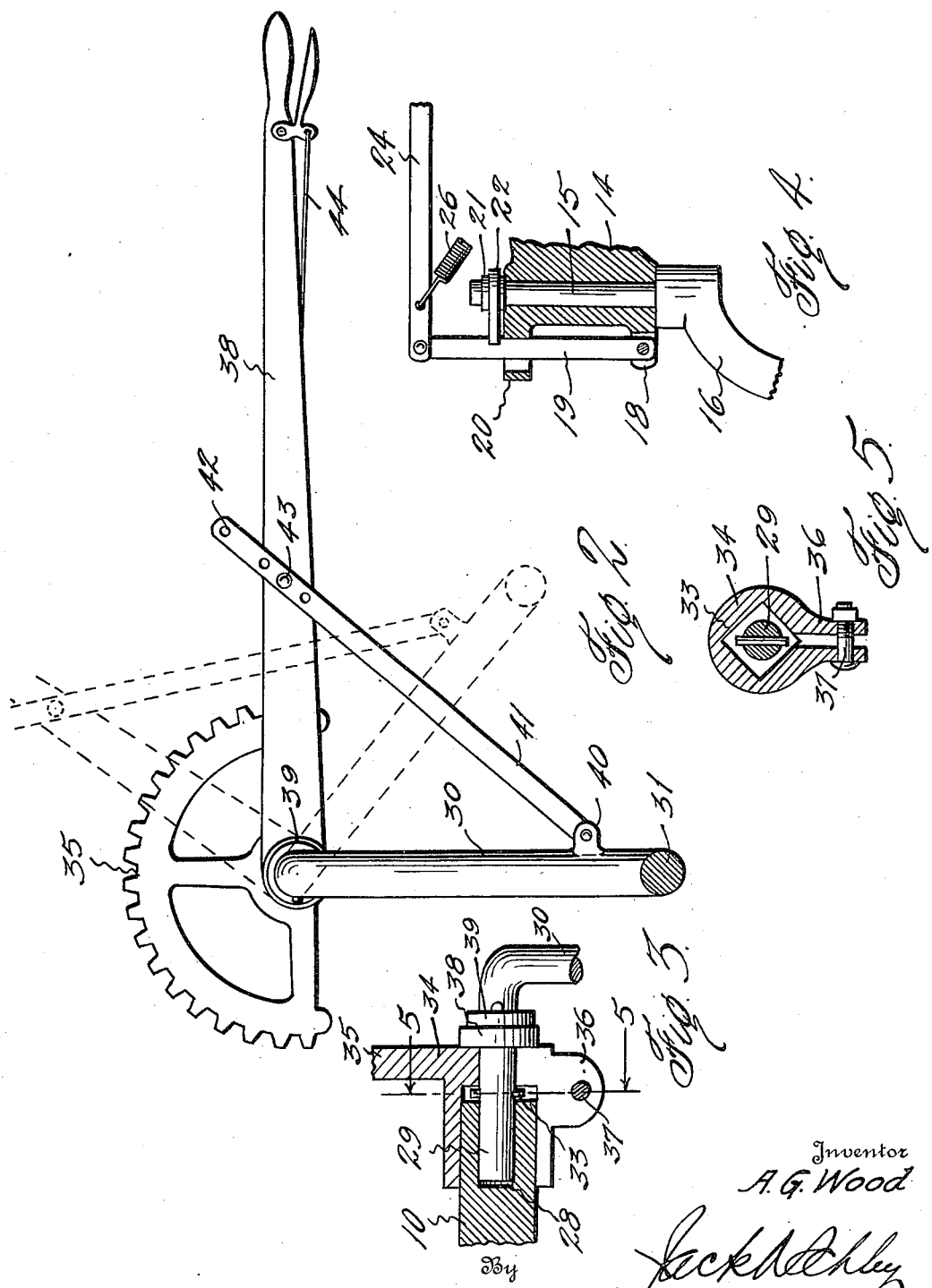

ALBERT G. WOOD, OF WILMER, TEXAS, ASSIGNOR OF ONE-HALF TO WILLIAM A. CLAUNCH, OF MAYPEARL, TEXAS.

DOUBLE-ROW LISTER.

1,402,276.  Specification of Letters Patent.  Patented Jan. 3, 1922.

Application filed September 20, 1920. Serial No. 411,400.

*To all whom it may concern:*

Be it known that I, ALBERT G. WOOD, a citizen of the United States, residing at Wilmer, in the county of Dallas and State of Texas, have invented certain new and useful Improvements in Double-Row Listers, of which the following is a specification.

This invention relates to new and useful improvements in double row listers.

The purpose of the invention is to provide a double row lister which may be readily adjusted to regulate the depth of the plows in a new and novel manner, whereby two rows may be plowed at the same time. Another feature is also to provide means for supporting the plows and also for making a short turn at the ends of the rows.

In carrying out the invention a pair of lister beams are clamped to an axle member which connects the latter in a rigid manner. These beams are transversely adjustable on the axle member in the usual manner so as to be moved closer together or farther apart. Angular axle standards are pivotally confined in the ends of the axle member so as to be capable of adjustment in a vertical arc.

A lever is attached to each standard and connected therewith, also with a brace member, whereby its angular disposition may be varied. Each lever is arranged to engage a locking segment which is held in fixed relation to the axle member, whereby the lever may be locked in adjusted positions and the axle standards thus held, thereby regulating the elevations of the plows. Pivoted caster wheels support the beam. Spring pressed locking devices are arranged to hold the wheels in a central position whereby the plows are kept in the row. A lever device is arranged for releasing the wheels at the ends of the rows so that they may swing and a short turn thus made.

The invention will be more readily understood from a reading of the following specification and by reference to the accompanying drawings, in which an example of the invention is shown, and wherein:

Fig. 1 is a perspective view of a lister constructed in accordance with my invention, Fig. 2 is a side elevation of one of the adjusting levers and its axle standard, Fig. 3 is a detail showing the manner of pivoting the axle standard in the axle member, Fig. 4 is a detail of the caster locking mechanism, and Fig. 5 is a sectional detail on the line 5—5 of Fig. 3.

In the drawings the numeral 10 designates a rigid bar or axle member which is supported near each end in suitable clamps 11, which may be longitudinally adjustable on said bar. These clamps extend above the bar and are suitably fastened to beams 12, crossing said bar at right angles thereto. The beams are of the usual construction and may have any suitable form of draft attachment at their forward ends. The beams are curved and carry the usual bottoms 13. At the rear of each beam a rearwardly directed bracket 14 is suitably fastened. Each bracket receives a vertical stem 15 of a yoke 16 in which a caster wheel 17 is journaled. Each bracket at its rear side has a pair of ears 18 between which the lower end of a vertical latch 19 is pivoted. Each latch extends through a keeper 20 at the upper end of its bracket 14. Each stem 15 is held against downward displacement in its bracket by a collar 21 on which a segment 22 is fastened, and each collar 21 bears on the upper side of its respective bracket 14 as is clearly shown in Fig. 4. Each segment has a notch 23 in its center which is normally engaged by the adjacent latch 19, whereby the caster wheel is held in line with the plow beams. From the upper end of each latch 19 a link 24 extends forwardly and is pivoted to the lower end of a lever yoke 25 which is pivoted a short distance below its lower ends to the sides of the plow beams 12. Near the rear end of each link 24 one end of a coil spring 26 is attached. Each spring 26 has its forward end attached to a lug 27 carried on its respective bracket 14. These springs act to pull the links 24 forwardly whereby the latches 19 are brought into engagement with the edges of the segments, so as to spring into the notches 23 when the caster wheels are swung to a central position. By pulling the yoke lever 25 forwardly the latches 19 will be disengaged from the notches 23, thus permitting the caster wheels 17 to turn as is shown in Fig. 1. In this way a short turn may be made at the end of the rows and when the plowing is again started the caster wheels will adjust themselves so that the latches will engage in the notches and hold said wheels in a central position, thus keeping the plows straight in the rows.

The important feature of the invention resides in the vertical adjustment and support of the beams. At each end the bar 10 is provided with an axial recess 28 into which is telescoped the inwardly directed upper end 29 of an axle standard 30. Each standard has an outwardly directed shank 31 extending from its lower end. On each shank a ground wheel 32 is mounted in a manner common to the mounting of agricultural wheels and forms no particular part of the invention. As is shown in Fig. 3, each end 29 is provided with a transverse pin 33, which is disposed adjacent the end of the bar 10. A clamp box 34 receives the end of the bar 10 at each end thereof and rotatably confines the pin 33 therein so that the standard 30 is free to swing and the end 29 rotate; however, the standard is held against inward and outward displacement by the pin 33. Each clamp box 34 carries an upstanding locking segment 35 and has depending ears 36 connected by a transverse bolt 37 whereby said box is clamped on the end of the bar 10.

A lever 38 is mounted on the end 29 of each standard and is rotatably confined thereon by means of a collar 39 which holds it against the end of the box 34. Each standard 30 has an ear 40 near its lower end to which is pivotally attached the lower end of a diagonal brace or link 41 which has a plurality of holes 42 at its upper end. Each lever 38 is provided with a bolt or pin 43 which is engaged in one of the holes 42 of its link 41, whereby the angular relation of the lever to the standard is fixed. By this arrangement it will be seen that when the lever 38 is swung at one side of the lister, the standard 30 will be swung in a vertical arc and the beam 12 on that side thus raised or lowered accordingly. Each lever 38 is provided with a locking plunger 44 for engaging its segment 35 whereby said lever is locked in position and its standard 30 is thus held at the angle to which it has been swung. The lever 38 in each instance exerts its pull on the standard through the agency of its link 41 and thus by adjusting the bolt 43 in the holes 42, the leverage may be varied as will be obvious. Also the elevation of each lever 38 at a given position of its standard, may be varied by engaging its bolt 43 in the different holes 42.

It will be seen that by swinging the levers 38 the depth at which the bottoms 13 plow may be regulated and said plows may be lifted from the ground if desired. The construction is simple and compact and not likely to get out of working order.

What I claim, is:

1. In a double row lister, a pair of plow beams having downwardly extending portions, a rearwardly extending bracket secured to each downwardly extending portion, said bracket having a vertical bore, a yoke having a vertical stem pivoted in each vertical bore with the upper end of the yoke slidably engaging said bracket, a caster wheel for each yoke, a collar fixed to the upper end of the stem and carrying a segment, said segment having a notch, a vertically swinging latch pivoted to the bracket below the segment, for movement into and out of said notch, a keeper secured to the bracket and receiving the latch, a yoke lever pivoted upon said plow beams, links pivotally connected with the yoke lever and with the latches, springs to move the links forwardly, plow shares secured to the downwardly extending portions of the plow beams, and wheeled supporting means secured to the plow beams in advance of the said downwardly extending portions.

2. In a double row lister, a pair of plow beams having downwardly extending portions, a rearwardly extending bracket secured to each downwardly extending portion, said bracket having a vertical bore, a yoke having a vertical stem pivoted in each vertical bore with the upper end of the yoke slidably engaging said bracket, a caster wheel for said yoke, a collar fixed to the upper end of the stem and carrying a segment, said segment having a notch, a vertically swinging latch pivoted to the bracket below the segment, for movement into and out of said notch, a keeper secured to the bracket above the pivot of the latch and receiving the latch, a yoke lever pivoted upon said plow beams, and extending below the same, links pivotally connected with the lower ends of the yoke lever and with the upper ends of the latches, springs to move the links forwardly, plow shares secured to the downwardly extending portions of the plow beams, and wheeled supporting means connected with the plow beams in advance of the said downwardly extending portions.

In testimony whereof I affix my signature.

ALBERT G. WOOD.